United States Patent
Fan et al.

(10) Patent No.: US 9,329,317 B2
(45) Date of Patent: May 3, 2016

(54) LCD AND BACKLIGHT MODULE THEREOF

(71) Applicant: Shenzhen China Star Optoelectronics Technology Co., Ltd., Shenzhen, Guangdong (CN)

(72) Inventors: Yong Fan, Guangdong (CN); Yongyuan Qiu, Guangdong (CN); Chao Ning, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 51 days.

(21) Appl. No.: 14/115,342

(22) PCT Filed: Jul. 15, 2013

(86) PCT No.: PCT/CN2013/079416
§ 371 (c)(1),
(2) Date: Nov. 2, 2013

(87) PCT Pub. No.: WO2015/003400
PCT Pub. Date: Jan. 15, 2015

(65) Prior Publication Data
US 2015/0015827 A1    Jan. 15, 2015

(30) Foreign Application Priority Data

Jul. 10, 2013 (CN) .......................... 2013 1 0289231

(51) Int. Cl.
*F21V 8/00* (2006.01)
*G02F 1/1335* (2006.01)

(52) U.S. Cl.
CPC .............. *G02B 6/0008* (2013.01); *G02B 6/001* (2013.01); *G02F 1/1336* (2013.01); *G02F 2001/133618* (2013.01)

(58) Field of Classification Search
CPC .............. G02F 2001/133607; G02F 1/133611; G02F 1/133604; G02F 1/133606; G02B 6/0005; G02B 6/0006; G02B 6/0008; G02B 6/001
USPC .................. 362/559, 610, 611, 615, 622, 330
See application file for complete search history.

(56) References Cited

U.S. PATENT DOCUMENTS 3,644,922 A * 2/1972 James et al. .................... 345/32
4,814,948 A * 3/1989 Hasegawa .................... 362/581

(Continued)

FOREIGN PATENT DOCUMENTS

| CN | 101440919 | * 12/2008 | .......... G02F 1/13357 |
| CN | 101440919 A | * 5/2009 | |

(Continued)

OTHER PUBLICATIONS

Liang Xing, Machine translation of CN101440919, Dec. 2008.*

*Primary Examiner* — Michael Caley
*Assistant Examiner* — Adam C Chen
(74) *Attorney, Agent, or Firm* — Andrew C. Cheng

(57) ABSTRACT

An LCD having a backlight module is proposed. The backlight module includes an ambient light collector for collecting ambient light; a back plate; a diffuser plate on the back plate; a plurality of optical fibers straightly fixed between the diffuser plate and the back plate and coupled to the ambient light collector. Microstructure is formed on the surface of the optical fibers straightly fixed between the diffuser plate and the back plate, and the microstructure makes light from the optical fibers evenly being emitted. The backlight module utilizes microstructure formed on a surface of optical fibers for evenly distributing light from the surface of the optical fibers. In hence, it effectively guides ambient light into the backlight module via the optical fibers and ensures at the same time that the light is evenly distributed to the backlight module.

14 Claims, 3 Drawing Sheets

(56) References Cited

U.S. PATENT DOCUMENTS

| | | | |
|---|---|---|---|
| 5,659,643 A * | 8/1997 | Appeldorn et al. | 385/31 |
| 6,008,898 A * | 12/1999 | Furstenau et al. | 356/519 |
| 2006/0250816 A1* | 11/2006 | Gao | G02B 6/0051 362/559 |
| 2007/0058388 A1* | 3/2007 | Takatori et al. | 362/554 |
| 2008/0002393 A1* | 1/2008 | Moon | 362/97 |
| 2008/0212306 A1* | 9/2008 | Huang | H05B 37/0236 362/85 |
| 2014/0126242 A1* | 5/2014 | Chen et al. | 362/610 |

FOREIGN PATENT DOCUMENTS

| | | | |
|---|---|---|---|
| CN | 201340462 Y | 11/2009 | |
| CN | 202275180 U | 6/2012 | |
| CN | 103032811 A | 4/2013 | |
| JP | 2005166321 A | 6/2005 | |
| JP | 2010272274 A | 12/2012 | |
| KR | 10-0818453 * | 11/2006 | G02F 1/13357 |
| KR | 818453 B1 * | 4/2008 | |

* cited by examiner

LCD AND BACKLIGHT MODULE THEREOF

BACKGROUND OF THE INVENTION

1. Field of the Invention

The present invention relates to a liquid crystal display (LCD) field, more particularly, to an LCD using optical fibers as backlight sources and the backlight module thereof.

2. Description of the Prior Art

Conventionally, most of backlight modules in a liquid crystal display (LCD) takes an original light source, which illuminates by energy like electrical power, as a backlight source, for instance Light Emitting Diode (LED), Cold Cathode Fluorescent Lamp (CCFL), etc. The LED is broadly applied as a backlight source in a backlight module on account of its high power-saving. With more and more consciousness for power-saving and enviromental protection, a reduction of power consumption of a backlight source in a backlight module is necessary. Therefore, it needs to lessen a number of original light sources to reduce power consumption of a backlight source or takes a new-type energy-saving light source as a backlight source in a backlight module to achieve power-saving.

Taking ambient light (like sunlight) as a backlight source in a backlight module is a new power-saving proposal. It needs no original light sources from power or decreases a proportion of original light sources in the power-saving proposal so that it saves energy substantially. Nowadays, a feasible way is to collect ambient light and then guide the light into a backlight module as a backlight source via a plurality of optical fibers. But, here is a problem to solve that how to effectively guide ambient light into a backlight module via optical fibers and ensure at the same time that the light is evenly distributed to a backlight module.

SUMMARY OF THE INVENTION

According to the present invention, a backlight module comprises: an ambient light collector for collecting ambient light; a back plate; a diffuser plate on the back plate; a plurality of optical fibers straightly fixed between the diffuser plate and the back plate and coupled to the ambient light collector. Microstructure is formed on the surface of the optical fibers straightly fixed between the diffuser plate and the back plate, and the microstructure makes light from the optical fibers evenly being emitted.

In one aspect of the present invention, the microstructure comprises a platform formed on the surface of the optical fibers straightly fixed between the diffuser plate and the back plate and a plurality of grooves in parallel on the platform.

In another aspect of the present invention, a direction of the grooves is perpendicular to an axial direction of the optical fibers In another aspect of the present invention, intervals among the plurality of the grooves along a direction far away from a light-in side of the optical fibers narrow down in order.

In another aspect of the present invention, a shape of the grooves is triangle, square, trapezoid or semicircle.

In another aspect of the present invention, the back plate comprises a first side plate and a second side plate set up in parallel and in opposition, wherein the first side plate is adjacent to a light-in side of the optical fibers, a plurality of holes are set up on the first side plate, a plurality of mounting holes are set up on the second side plate, the optical fibers are fixed into the mounting holes via the holes, and the optical fibers are fixed and coupled to the holes so that the optical fibers are straightly fixed between the first side plate and the second side plate.

In another aspect of the present invention, a coupling sleeve is set up between the optical fibers and the holes, the coupling sleeve covers the optical fibers, the coupling sleeve is coupled to the holes by threads, a mounting sleeve is set up between the optical fibers in the mounting holes and the mounting holes, the mounting sleeve is fixed and coupled to the optical fibers, and the mounting sleeve is coupled to the mounting holes by threads.

In another aspect of the present invention, a reflecting component is set up between a side surface of the optical fibers in the mounting holes and the mounting holes and used for reflecting light from the side surface of the optical fibers back to the optical fibers.

In another aspect of the present invention, the mounting sleeve covers the side surface of the optical fibers in the mounting holes, a reflecting component is set up between the mounting sleeve and the side surface of the optical fibers and used for reflecting light from the side surface of the optical fibers back to the optical fibers.

According to the present invention, a liquid crystal display (LCD) comprises an LCD panel and a backlight module set up with the LCD panel in opposition. The backlight module provides a display light source to the LCD panel for the LCD panel displaying images. The backlight module comprises an ambient light collector for collecting ambient light; a back plate; a diffuser plate on the back plate; a plurality of optical fibers straightly fixed between the diffuser plate and the back plate and coupled to the ambient light collector. Microstructure is formed on the surface of the optical fibers straightly fixed between the diffuser plate and the back plate, and the microstructure makes light from the optical fibers evenly being emitted.

In one aspect of the present invention, the microstructure comprises a platform formed on the surface of the optical fibers straightly fixed between the diffuser plate and the back plate and a plurality of grooves in parallel on the platform.

In another aspect of the present invention, a direction of the grooves is perpendicular to an axial direction of the optical fibers In another aspect of the present invention, intervals among the plurality of the grooves along a direction far away from a light-in side of the optical fibers narrow down in order.

In another aspect of the present invention, a shape of the grooves is triangle, square, trapezoid or semicircle.

In another aspect of the present invention, the back plate comprises a first side plate and a second side plate set up in parallel and in opposition, wherein the first side plate is adjacent to a light-in side of the optical fibers, a plurality of holes are set up on the first side plate, a plurality of mounting holes are set up on the second side plate, the optical fibers are fixed into the mounting holes via the holes, and the optical fibers are fixed and coupled to the holes so that the optical fibers are straightly fixed between the first side plate and the second side plate.

In another aspect of the present invention, a coupling sleeve is set up between the optical fibers and the holes, the coupling sleeve covers the optical fibers, the coupling sleeve is coupled to the holes by threads, a mounting sleeve is set up between the optical fibers in the mounting holes and the mounting holes, the mounting sleeve is fixed and coupled to the optical fibers, and the mounting sleeve is coupled to the mounting holes by threads.

In another aspect of the present invention, a reflecting component is set up between a side surface of the optical fibers in the mounting holes and the mounting holes and used for reflecting light from the side surface of the optical fibers back to the optical fibers.

In another aspect of the present invention, the mounting sleeve covers the side surface of the optical fibers in the mounting holes, a reflecting component is set up between the mounting sleeve and the side surface of the optical fibers and used for reflecting light from the side surface of the optical fibers back to the optical fibers.

It is therefore a primary object of the present invention to provide an LCD and a backlight module thereof whose microstructure formed on a surface of optical fibers for evenly distributing light from the surface of the optical fibers. In hence, it effectively guides ambient light into the backlight module via the optical fibers and ensures at the same time that the light is evenly distributed to the backlight module.

BRIEF DESCRIPTION OF THE DRAWINGS

FIG. 4a shows that the optical fibers are fixed to a hole through the coupling sleeve in FIG. 3a.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
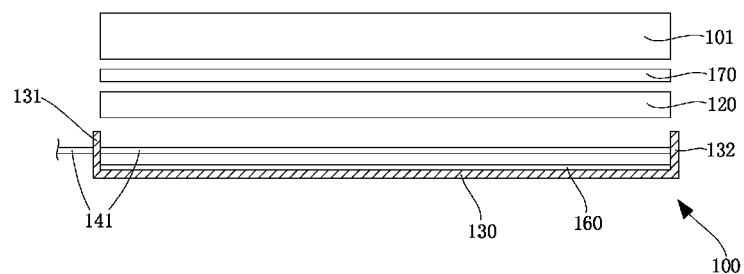
FIG. 1 is a diagram of an LCD of an embodiment according to the present invention.
Figure 2:
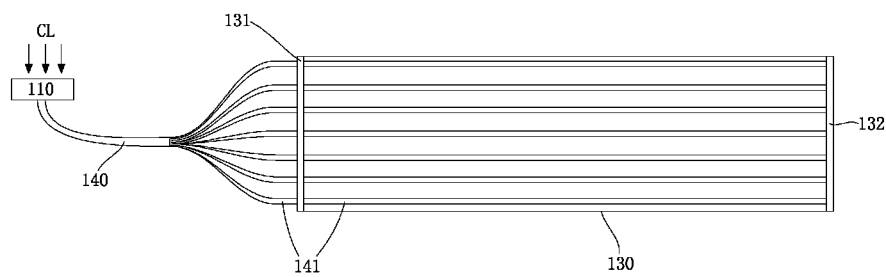
FIG. 2 is a diagram of a backlight module of an embodiment according to the present invention.

FIG. 1 is a diagram of an LCD of an embodiment according to the present invention. FIG. 2 is a diagram of a backlight module of an embodiment according to the present invention. In FIG. 2, it omits a diffuser plate, optical film and reflector sheet for conveninently showing connection of optical fibers between two side plates of a back plate.

Please refer to FIG. 1 and FIG. 2. A backlight module 100 of the embodiment according to the present invention is set up in opposition to an LCD panel 101 to form an LCD. The backlight module 100 provides a display light source to the LCD panel 101 for displaying images. The backlight module 100 comprises an ambient light collector 110, a diffuser plate 120, a back plate 130, a plurality of optical fibers 141, a reflector sheet 160 and an optical film 170. The ambient light collector 110 is coupled to the optical fibers 141 and used for collecting ambient light CL, such as sunlight or lamp light, to provide light to the optical fibers 141. The diffuser plate 120 is set up on the back plate 130 and used for evenly diffusing the light from the optical fibers 141. The optical fibers 141 are coupled to the ambient light collector 110, fixed straightly between the diffuser plate 120 and the back plate 130 and used for transmitting the light from the ambient light collector 110. Microstructure is formed on the surface of the optical fibers 141, which is straightly fixed between the diffuser plate 120 and the back plate 130, and used for emitting light evenly to the diffuser plate 120. The reflector sheet 160 is set up between the plurality of optical fibers 141 and the back plate 130 and used for reflecting light. The optical film 170 is set up on the diffuser plate 120 and used for improving optical effect on the light from the diffuser plate 120.

As FIG. 2 shows, the plurality of optical fibers 141 of the embodiment are covered by a tegmen to form a bunch of optical fibers 140 to conveniently couple to the ambient light collector 110. One end of the bunch of optical fibers 140 is coupled to the ambient light collector 110, and the seperated optical fibers 141 are fixed straightly between the diffuser plate 120 and the back plate 130.

Figure 3A:
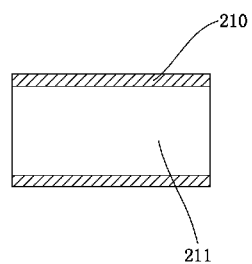
FIG. 3a and FIG. 3b are diagrams of a coupling sleeve and a mounting sleeve of the embodiment according to the present invention respectively.
Figure 3B:
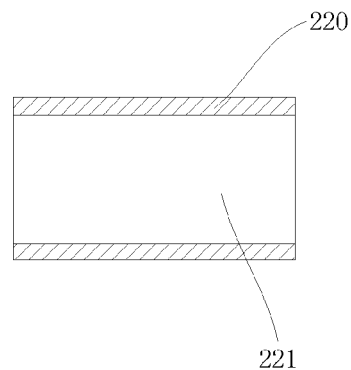
Figure 4A:
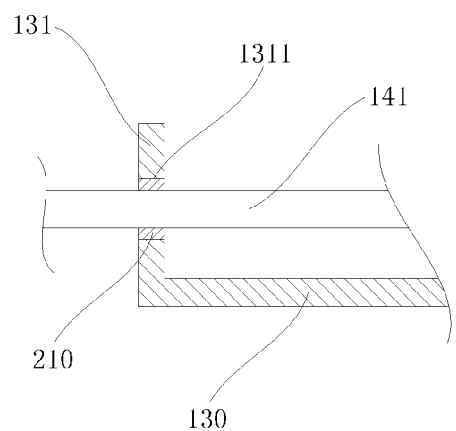
Figure 4B:
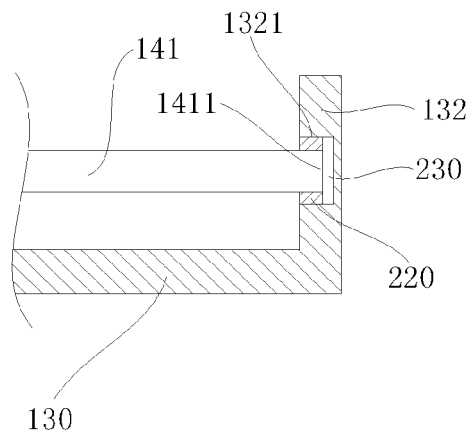
FIG. 4b shows that the optical fibers are fixed to a mounting hole through the mounting sleeve in FIG. 3b.

FIG. 3a and FIG. 3b are diagrams of a coupling sleeve and a mounting sleeve of the embodiment according to the present invention respectively. FIG. 4a is a state diagram that the optical fibers of the embodiment according to the present invention is fixed to a hole through the coupling sleeve in FIG. 3a, and FIG. 4b is a state diagram that the optical fibers of the embodiment according to the present invention is fixed to a mounting hole through the mounting sleeve in FIG. 3b.

Please refer to FIG. 2 to FIG. 4b together. For fixing straightly the seperated optical fibers 141 between the diffuser plate 120 and the back plate 130, the back plate 130 at least comprises a first side plate 131 and a second side plate 132 set up in parallel and in opposition. The first side plate 131 is adjacent to the end of the bunch of optical fibers 140 coupled to the ambient light collector 110 (i.e. the light-in end of the seperated optical fibers 141), and the second side plate 132 is far away from the end of the bunch of optical fibers 140 coupled to the ambient light collector 110. A plurality of holes 1311 are arranged on the first side plate 131, and a number of the holes 1311 is equal to that of the seperated optical fibers 141. A plurality of mounting holes 1321 are arranged on the second side plate 132, and each of the mounting holes 1321 corresponds to each of the holes 1311 which means a number of the mounting holes 1321 is also equal to that of the seperated optical fibers 141. The optical fibers 141 pass through the holes 1311 into space between the diffuser plate 120 and the back plate 130 and then adhere to the mounting holes 1321. The optical fibers 141 are fixed and coupled to the holes 1311 so that the optical fibers 141 are straightly fixed between the first side plate 131 and the second side plate 132.

A coupling sleeve 210 is set up between the optical fiber 141 and the hole 1311. The coupling sleeve 210 is cylindric and a through hole 211 is formed in the central axis direction. The diameter of the through holes 211 is equal or about larger than that of the optical fibers 141, and thus the optical fibers 141 are free to pass through the through holes 211. The outside diameter of the coupling sleeves 210 is equal or about shorter than that of the holes 1311, and thus the coupling sleeve 210 is set up inside the holes 1311. After the optical fiber 141 passes through the through hole 211, the coupling sleeve 210 covers the surface of the optical fibers 141. A socket mechanism is set up inside the wall of the coupling sleeve 210 to cover and fix the optical fiber 141. Or the coupling sleeve 210 and the optical fiber 141 are sticked together by filling adhesive between the inside wall of the coupling sleeve 210 and the surface of the optical fiber 141, and then the coupling sleeve 210 fixed on the surface of the optical fiber 141 is arranged inside the hole 1311. The coupling sleeve 210 whose outside wall with outside threads and the hole 1311 whose inside wall with inside threads are fixed together by threads so that the optical fibers 141 is fixed inside the holes 1311.

A mounting sleeve 220 is set up between the optical fiber 141 and the mounting hole 1321. The structure of the mounting sleeve 220 is the same as the coupling sleeve 210. The mounting sleeve 220 is cylindric and a through hole 211 is formed in the central axis direction. The diameter of the through holes 211 is equal or about larger than that of the optical fibers 141, and thus the optical fibers 141 are free to pass through the through holes 211. The outside diameter of the mounting sleeves 220 is equal or about shorter than that of the mounting holes 1321, and thus the mounting sleeve 220 is set up inside the mounting hole 1321. After the optical fiber 141 pass through the through hole 211, the mounting sleeve 220 covers the surface of the optical fiber 141. A socket mechanism is set up inside the wall of the mounting sleeve 220 to cover and fix the optical fiber 141. Or the mounting sleeve 220 and the optical fiber 141 are sticked together by filling adhesive between the inside wall of the mounting sleeve 220 and the surface of the optical 141. The mounting hole 1321 is preferred to be blind hole. The mounting sleeve 220 whose outside surface with outside threads and fixed on the surface of the optical fiber 141 is fixed by threads in the mounting holes 1321 whose inside wall with inside threads so that the optical fiber 141 is fixed inside the mounting hole 1321. A high reflecting component 230 is set up between a side surface 1411 of the optical fiber 141 and the mounting holes 1321 for preventing light from emitting from the side surface 1411 of the optical fibers in the mounting hole 1321. For instance, a reflector coated by high reflecting metallic film or by high reflecting dielectric film reflects the light from the side surface 1411 of the optical fibers 141 to the optical fiber 141. The specific benefit is described in the following. In addition, the high reflecting metallic film or the high reflecting dielectric film is either clad directly on the side surface 1411 of the optical fiber 141 or in the mounting hole 1321.

Figure 5:
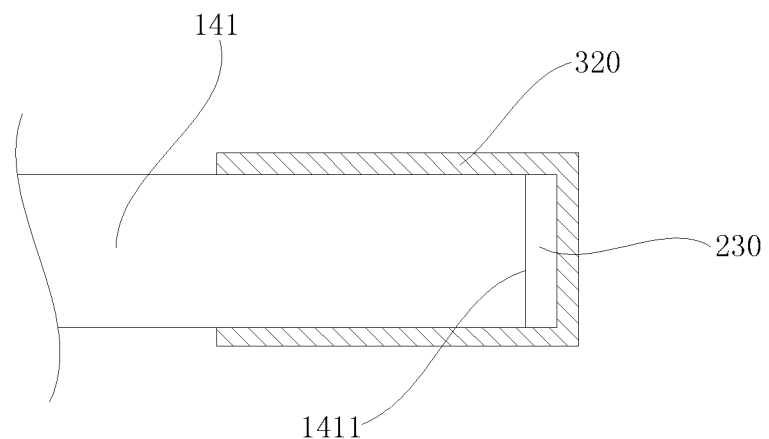
FIG. 5 is a diagram that another structure of the mounting sleeve of the embodiment according to the present invention.

FIG. 5 is a diagram that another structure of the mounting sleeve of the embodiment according to the present invention.

Please refer to FIG. 5. FIG. 5 illustrates an optional structure for the mounting sleeve. Compared with the mounting sleeve in FIG. 3b, the mounting sleeve in FIG. 5 directly covers the optical fibers 14 to completely covers the side surface 1411 of the optical fiber 141 because one side of the mounting sleeve 320 is sealed. Therefore, the high reflecting component 230 is set up between the side surface 1411 of the optical fiber 141 and the mounting sleeve 320.

Figure 6:
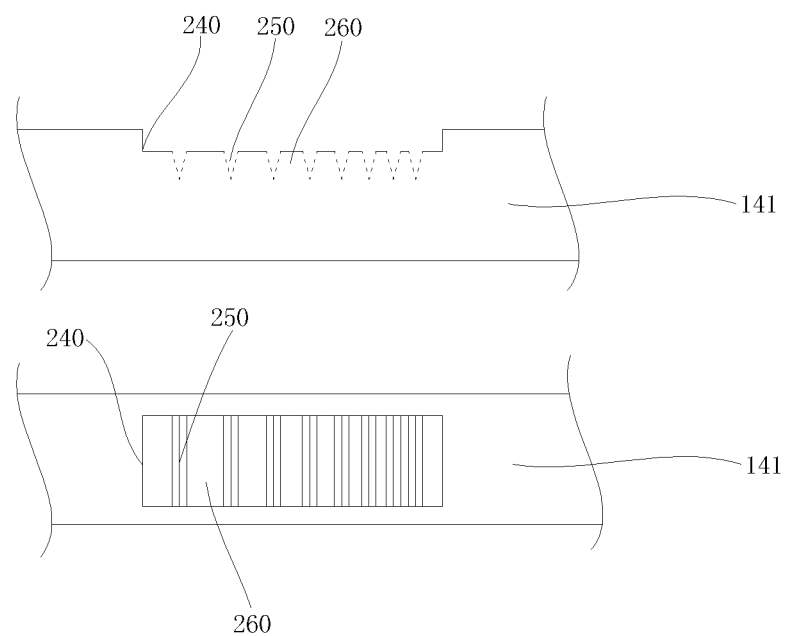
FIG. 6 is a diagram of microstructure formed on the surface of the optical fibers of an embodiment according to the present invention.

FIG. 6 is a diagram of microstructure formed on the surface of the optical fibers of an embodiment according to the present invention. In FIG. 6, the upper figure is a front view of the optical fibers, and the lower one is a top view of the optical fibers.

In order to allow the surface of the optical fiber 141 straightly fixed between the diffuser plate 120 and the back plate 130 to emits light, it needs microstructure on the surface of the optical fiber 141 straightly fixed between the diffuser plate 120 and the back plate 130 so that the light from the optical fiber 141 evenly emits. Please refer to FIG. 6, a forming process of the microstructure is: first, cutting the surface of the optical fiber 141 to form a platform 240 for exposing a core of the optical fiber 141 to air; next, forming a plurality of grooves 250 in parallel on the platform 240. A shape of the grooves 250 is triangle in the embodiment and also square, trapezoid or semicircle in the present invention. It is preferred that a direction of the grooves 250 is perpendicular to the axial direction of the optical fiber 141. The process of forming the platform 240 and then the grooves 250 makes one light reflection on the platform 240 so that more light is emitted from the grooves 250. Furthermore, it has larger emitting angle perpendicular to the axial direction of the optical fibers 141 because of the platform 240 so that the emitted light is more even.

In order to make brightness of the light from the surface, close to the first side plate 131 of the optical fibers 141 straightly fixed between the diffuser plate 120 and the back plate 130, be equal to that close to the second side plate 132, it narrows down intervals among the plurality of the grooves 250 along the direction from the first side plate 131 to the second side plate 132 (i.e. the direction away from the light-in side of the optical fibers 141) in order. That is to say that it narrows down widths of protrusions 260 among the plurality of grooves 250 along the direction from the first side plate 131 to the second side plate 132 in order. Thus, the light from a range of the whole platform 240 is more even.

In sum, the present invention provides an LCD and the backlight module thereof whose microstructure is formed on a surface of each for the optical fibers for evenly distributing light from the surface of each of the optical fibers. In hence, it effectively guides ambient light into the backlight module via the optical fibers and ensures at the same time that the light is evenly distributed to the backlight module.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A backlight module, comprising:
   an ambient light collector for collecting ambient light;
   a back plate;
   a diffuser plate on the back plate;
   a plurality of optical fibers straightly fixed between the diffuser plate and the back plate and coupled to the ambient light collector;
   wherein microstructure is formed on the surface of the optical fiber straightly fixed between the diffuser plate and the back plate, and the microstructure makes light from the optical fiber evenly being emitted;
   wherein the back plate comprises a first side plate and a second side plate set up in parallel and in opposition, wherein the first side plate is adjacent to a light-in side of the optical fibers, a plurality of holes are set up on the first side plate, a plurality of mounting holes are set up on the second side plate, each of the optical fibers is fixed into a corresponding mounting hole of the plurality of mounting holes via a corresponding hole of the plurality of holes, and the optical fibers are fixed and coupled to the holes so that the optical fibers are straightly fixed between the first side plate and the second side plate;
   wherein a coupling sleeve is set up between the optical fiber and the hole, the coupling sleeve covers the optical fiber, the coupling sleeve is coupled to the hole by threads, a mounting sleeve is set up between the optical fiber in the mounting hole and the mounting hole, the mounting sleeve is fixed and coupled to the optical fiber, and the mounting sleeve is coupled to the mounting hole by threads;
   wherein the coupling sleeve and the optical fibers are stuck together by filling adhesive between an inside wall of the coupling sleeve and the optical fibers.

2. The backlight module of claim 1, wherein the microstructure comprises a platform formed on the surface of the optical fiber straightly fixed between the diffuser plate and the back plate and a plurality of grooves in parallel on the platform.

3. The backlight module of claim 2, wherein a direction of the grooves is perpendicular to an axial direction of the optical fibers.

4. The backlight module of claim 2, wherein intervals among the plurality of grooves along a direction away from a light-in side of the optical fibers narrow down in order.

5. The backlight module of claim 2, wherein a shape of the grooves is triangle, square, trapezoid or semicircle.

6. The backlight module of claim 1, wherein a reflecting component is set up between a side surface of the optical fiber in the mounting holes and the mounting hole and used for reflecting light from the side surface of the optical fiber back to the optical fiber.

7. The backlight module of claim 1, wherein the mounting sleeve covers the side surface of the optical fiber in the mounting hole, a reflecting component is set up between the mounting sleeve and the side surface of the optical fiber and used for reflecting light from the side surface of the optical fiber back to the optical fiber.

8. A liquid crystal display (LCD), comprising an LCD panel and a backlight module set up with the LCD panel in opposition, the backlight module providing a display light source to the LCD panel for the LCD panel displaying images, the backlight module comprising:
an ambient light collector for collecting ambient light;
a back plate;
a diffuser plate on the back plate;
a plurality of optical fibers straightly fixed between the diffuser plate and the back plate and coupled to the ambient light collector;
wherein microstructure is formed on the surface of the optical fibers straightly fixed between the diffuser plate and the back plate, and the microstructure makes light from the optical fibers evenly being emitted;
wherein the back plate comprises a first side plate and a second side plate set up in parallel and in opposition, wherein the first side plate is adjacent to a light-in side of the optical fibers, a plurality of holes are set up on the first side plate, a plurality of mounting holes are set up on the second side plate, each of the optical fibers is fixed into a corresponding mounting hole of the plurality of mounting holes via a corresponding hole of the plurality of holes, and the optical fibers are fixed and coupled to the holes so that the optical fibers are straightly fixed between the first side plate and the second side plate;
wherein a coupling sleeve is set up between the optical fiber and the hole, the coupling sleeve covers the optical fiber, the coupling sleeve is coupled to the hole by threads, a mounting sleeve is set up between the optical fiber in the mounting hole and the mounting holes, the mounting sleeve is fixed and coupled to the optical fibers, and the mounting sleeve is coupled to the mounting holes by threads;
wherein the coupling sleeve and the optical fibers are stuck together by filling adhesive between an inside wall of the coupling sleeve and the optical fibers.

9. The LCD of claim 8, wherein the microstructure comprises a platform formed on the surface of the optical fiber straightly fixed between the diffuser plate and the back plate and a plurality of grooves in parallel on the platform.

10. The LCD of claim 9, wherein a direction of the grooves is perpendicular to an axial direction of the optical fibers.

11. The LCD of claim 9, wherein intervals among the plurality of the grooves along a direction away from a light-in side of the optical fibers narrow down in order.

12. The LCD of claim 9, wherein a shape of the grooves is triangle, square, trapezoid or semicircle.

13. The LCD of claim 8, wherein a reflecting component is set up between a side surface of the optical fiber in the mounting holes and the mounting hole and used for reflecting light from the side surface of the optical fibers back to the optical fiber.

14. The LCD of claim 8, wherein the mounting sleeve covers the side surface of the optical fiber in the mounting hole, a reflecting component is set up between the mounting sleeve and the side surface of the optical fiber and used for reflecting light from the side surface of the optical fiber back to the optical fiber.

* * * * *